March 25, 1969     G. E. ASHTON     3,434,454

MAINTENANCE METER

Filed June 9, 1967

INVENTOR.
G. Elmo Ashton
BY
Barnard, McGlynn & Reising
ATTORNEYS

United States Patent Office 3,434,454
Patented Mar. 25, 1969

3,434,454
MAINTENANCE METER
G. Elmo Ashton, 31286 Churchill,
Birmingham, Mich. 48009
Filed June 9, 1967, Ser. No. 644,930
Int. Cl. G09f 9/00
U.S. Cl. 116—133      6 Claims

ABSTRACT OF THE DISCLOSURE

A maintenance indicator comprising a plurality of indicator discs rotatably supported on a shaft which is in turn supported by a housing. A resilient plastic foam material defines a pad which is supported by the housing and engages the respective disc so that each disc may be rotated to a predetermined position and maintained in the position by the pad. Each disc includes a plurality of indicia disposed about its peripheral surface with a notch in the peripheral surface between each indicia. There is included a cover plate having an aperture therein so that one indicia on each disc is visible. The cover plate is removably connected to the housing by a snap tab and groove arrangement. The cover plate includes a pair of lips for engaging the grooves of the respective discs on each side of the aperture to positively prevent rotation of the disc when the cover plate is connected to the housing.

---

The instant invention has particular utility when used with aircraft. An aircraft is licensed to fly so long as the aicraft is given certain periodic maintenance inspections. For example, each plane may require an inspection every 25 hours, of flying time, an inspection every 100 hours, and an annual inspection. If these inspections are not completed, the license of the aircraft automatically expires. If a pilot were to fly an aircraft with an inspection past due, the aircraft might not be licensed, which in many instances would be a violation and could void any insurance protection.

Most of the prior art meters may be manually changed or may be accidentally changed. It is very important that a meter utilized with an aircraft be capable of being selectively set to indicate when the respective inspections are due while also positively preventing the inadvertent change of such indications.

Accordingly, it is an object and feature of this invention to provide a maintenance indicator which may be set to indicate when various periodic inspections are due and which includes means for positively preventing the resetting of the indicator without an intentional manipulation thereof.

Another object and feature of this invention is to provide a maintenance indicator having a plurality of indicator discs with each of the discs having a plurality of indicia on the peripheral surface and support means for rotatably supporting each of the discs and friction means resisting rotation of each of the discs and locking means engageable with the discs for positively preventing rotation thereof.

Other objects, features, and attendant advantages of the present invention will be readily appreciated as the same becomes better understood by reference to the following detailed description when considered in connection with the accompanying drawings wherein.

Referring now to the drawings, wherein like numerals indicate like or corresponding parts throughout the several views, a preferred embodiment of an aircraft maintenance indicator of the instant invention is generally shown at 10.

Figure 1:
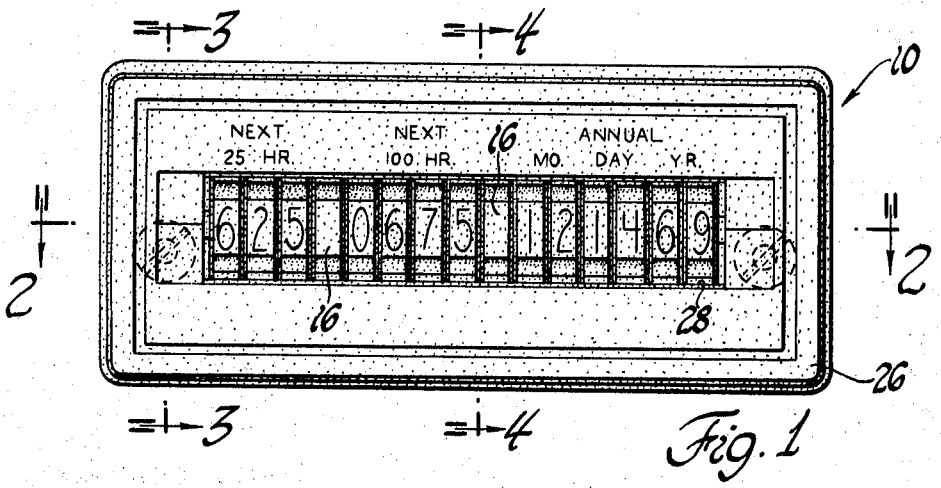
FIGURE 1 is a front elevational view of a preferred embodiment of the instant invention.
Figure 2:
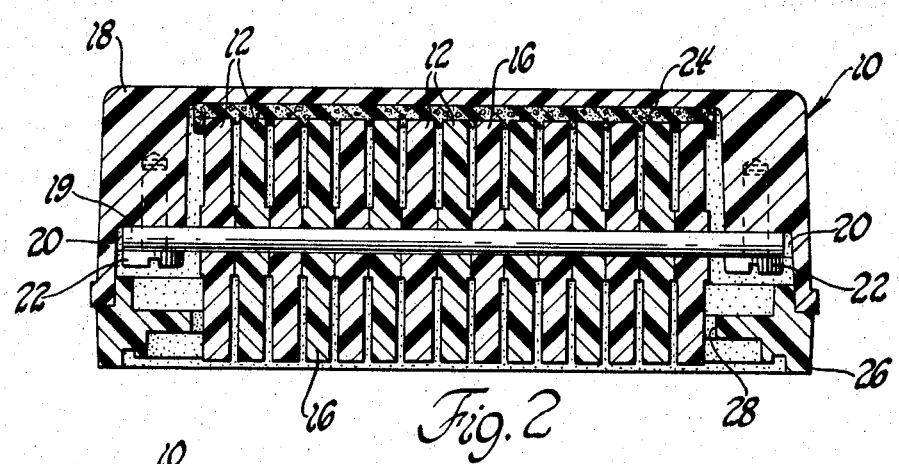
FIGURE 2 is a cross-sectional view taken substantially along line 2—2 of FIGURE 1.

The indicator 10 includes a plurality of indicator discs 12. Each 12 has a pluraliy of indicia on the peripheral surface thereof with a notch 14 on either side of each indicia. In other words, the indicia and the notches are alternately disposed about the circumference of each disc. There are also included spacer discs 16 which have no indicia thereon.

A support means rotatably supports each of the discs 12 and 16 and includes a housing 18 and a shaft 19, which is supported by the housing. More specifically, the housing 18 has a pair of recesses 20 therein and the bolts 22 are threaded into the housing so that the heads of the bolts 22 hold the ends of the shaft 19 in the recesses 20. The discs 12 and 16 are rotatably supported on the shaft 19.

There is also included a friction means comprising a resilient plastic foam material defining a pad 24 which engages the discs 12 and 16 to resist rotation thereof so that each disc 12 may be rotated to a predetermined position and maintained in that position by the pad 24. In other words, an instrument, tool, or the like, may be disposed in one of the notches 14 of each disc to rotate the disc against the frictional resistance provided by the pad 24. Once each disc 12 has been thusly rotated, the pad 24 will maintain the disc in the position to which it has been rotated.

There is also included locking means comprising the cover plate 26 which is engageable with the discs 12 and 16 for positively preventing rotation thereof. The cover plate 26 includes at least one aperture 28 for allowing one indicia on each disc to be visible when the cover plate 28 is connected to the housing 18 as illustrated.

Figures 3, 4:
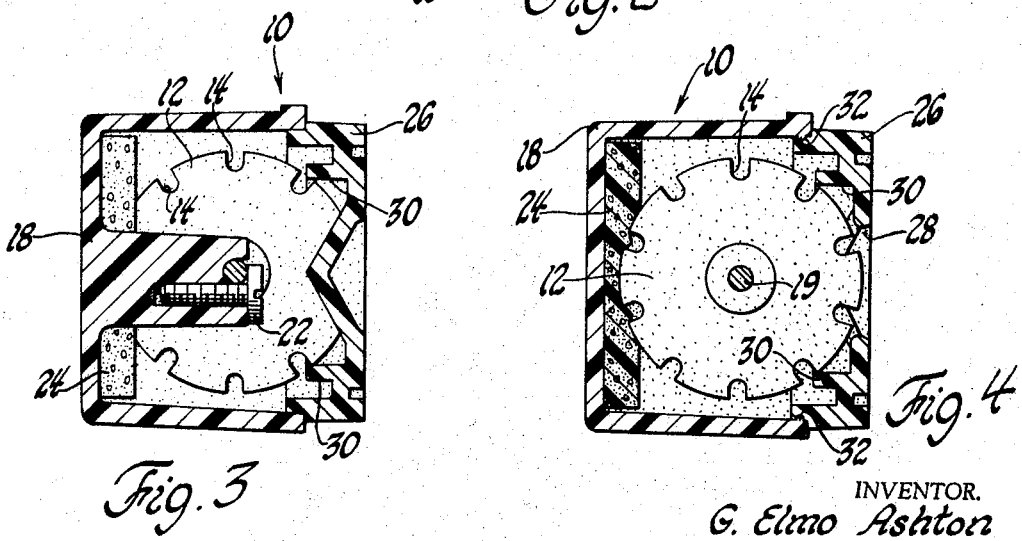
FIGURE 3 is a cross-sectional view taken substantially along line 3—3 of FIGURE 1.
FIGURE 4 is a cross-sectional view taken substantially along line 4—4 of FIGURE 1.

The cover plate 26 includes a pair of parallel lips 30 disposed on opposite sides of the aperture 28 for engaging the notches 14 in the respective disc 12 and 16 on each side of the visible indicia, as best illustrated in FIGURES 3 and 4. The lips 30, therefore, positively prevent rotation of the respective discs when the cover 26 is connected to the housing 18.

There is also included connecting means comprising the snap tab and groove arrangement 32 for removably connecting the cover plate 26 to the housing 18. Thus, the cover plate 26 is removably snapped into connection with the housing 18. The snap tab and groove arrangement 32 extends along only the mid-portion of the assembly and therefore is not shown in the cross-sectional view in FIGURE 3. It will be understood to those skilled in the art that various other arrangements may be utilized to removably connect the cover 26 to the housing 18.

As illustrated in FIGURE 1, various indicia are disposed on the cover plate. As indicated, the first three discs 12 indicate that the NEXT 25 HR. inspection is due at 625 hours. In addition, the next group of indicia indicate that the NEXT 100 HR. inspection is due at 675 hours. The last six discs 12 indicate that the next annual inspection is due in the twelfth month on the fourteenth day of the sixty-ninth year.

The invention has been described in an illustrative manner and it is to be understood that the terminology which has been used is intended to be in the nature of words of description rather than of limitation.

Obviously, many modifications and variations of the present invention are possible in light of the above teachings. It is therefore, to be understood that within the

I claim:
1. A maintenance indicator comprising; a plurality of indicator discs, each of said discs having a plurality of indicia on the peripheral surface thereof, a housing, a shaft supported by said housing, said discs being rotatably supported on said shaft, friction means engaging said discs to resist rotation thereof so that each disc may be rotated to a predetermined position and maintained in said position by said friction means, each disc having a plurality of spaced notches therein and disposed about the peripheral surface thereof, a cover plate removably mounted on said housing and including viewing means for allowing said discs to be viewed, said cover plate including locking means engageable with said discs for positively preventing rotation thereof.

2. An indicator as set forth in claim 1 wherein said friction means comprises a resilient plastic foam material supported by said support means.

3. An indicator as set forth in claim 1 wherein said viewing means comprises at least one aperture for allowing one indicia on each disc to be visible when said cover plate is connected to said housing.

4. An indicator as set forth in claim 3 wherein said locking means includes a pair of spaced parallel lips disposed on said cover plate on opposite sides of said aperture for engaging the notches in the respective discs on each side of the visible indicia.

5. An indicator as set forth in claim 4 wherein the connection between said cover plate and said housing includes a snap tab and groove arrangement for removably snapping said cover plate into connection with said housing.

6. An indicator as set forth in claim 5 including indicia on said cover plate as follows: NEXT 25 HR.; NEXT 100 HR.; and ANNUAL MO. DAY YR.

References Cited

UNITED STATES PATENTS

| | | | |
|---|---|---|---|
| 1,235,924 | 8/1917 | Read | 40—68 |
| 1,644,471 | 10/1927 | Hagerman | 40—68 |
| 1,656,227 | 1/1928 | Patchin | 235—117 XR |
| 2,492,592 | 12/1949 | Perry et al. | 40—68 XR |
| 2,787,851 | 4/1957 | Perry | 40—68 |
| 2,874,672 | 2/1959 | Hamm | 116—133 |
| 3,310,025 | 3/1967 | Egher | 116—133 |

LOUIS J. CAPOZI, *Primary Examiner.*

U.S. Cl. X.R.
40—68; 235—117